(12) United States Patent
Jin et al.

(10) Patent No.: US 10,241,223 B2
(45) Date of Patent: Mar. 26, 2019

(54) DOWNHOLE PIEZOELECTRIC ACOUSTIC TRANSDUCER

(71) Applicant: HALLIBURTON ENERGY SERVICES, INC., Houston, TX (US)

(72) Inventors: Jing Jin, Singapore (SG); Abdul Wahab Chowdhury, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 289 days.

(21) Appl. No.: 15/300,214

(22) PCT Filed: Nov. 19, 2015

(86) PCT No.: PCT/US2015/061538
§ 371 (c)(1),
(2) Date: Sep. 28, 2016

(87) PCT Pub. No.: WO2017/086968
PCT Pub. Date: May 26, 2017

(65) Prior Publication Data
US 2017/0269250 A1 Sep. 21, 2017

(51) Int. Cl.
*G01V 1/50* (2006.01)
*G01V 1/40* (2006.01)
(Continued)

(52) U.S. Cl.
CPC .............. *G01V 1/50* (2013.01); *B06B 1/0611* (2013.01); *G01V 1/159* (2013.01); *G01V 1/186* (2013.01);
(Continued)

(58) Field of Classification Search
CPC ....................................................... G01V 1/50
See application file for complete search history.

(56) References Cited

U.S. PATENT DOCUMENTS

| | | | | |
|---|---|---|---|---|
| 4,237,399 A | * | 12/1980 | Sakamoto | G11B 5/588 310/317 |
| 4,689,514 A | * | 8/1987 | Kondoh | G11B 5/588 310/317 |

(Continued)

FOREIGN PATENT DOCUMENTS

| | | |
|---|---|---|
| WO | 2009095446 | 8/2009 |
| WO | 2015015452 | 2/2015 |
| WO | 2015126417 | 8/2015 |

OTHER PUBLICATIONS

Halliburton, XBAT Azimuthal Sonic and Ultrasonic LWD Service, 2014, 2 pages.

(Continued)

*Primary Examiner* — Hovhannes Baghdasaryan
(74) *Attorney, Agent, or Firm* — Kilpatrick Townsend & Stockton LLP

(57) ABSTRACT

A sensor system for use in a wellbore is provided that can include a piezoelectric transducer for transmitting an acoustic wave into a fluid medium positioned in the wellbore by repeatedly bending between two positions in response to an actuation signal. The piezoelectric transducer can include at least four piezoelectric layers stacked on top of one another. Each of the four piezoelectric layers can be coupled to an adjacent layer via a bonding material. Each of the four piezoelectric layers can include a piezoelectric material, a top electrode coupled to a top surface of the piezoelectric material, and a bottom electrode coupled to a bottom surface of the piezoelectric material. The sensor system can also include a hydrophone for detecting a reflection or a refraction of the acoustic wave off an object in the wellbore and transmitting an associated signal to a processing device.

18 Claims, 8 Drawing Sheets

(51) Int. Cl.
*G01V 1/48* (2006.01)
*G01V 1/18* (2006.01)
*B06B 1/06* (2006.01)
*G01V 1/02* (2006.01)
*G01V 1/24* (2006.01)

(52) U.S. Cl.
CPC ............... *G01V 1/189* (2013.01); *G01V 1/24* (2013.01); *G01V 1/40* (2013.01); *G01V 1/48* (2013.01); *G01V 2200/16* (2013.01); *G01V 2210/6222* (2013.01)

(56) References Cited

U.S. PATENT DOCUMENTS

| | | | |
|---|---|---|---|
| 5,410,205 A * | 4/1995 | Gururaja | B06B 1/0614 310/321 |
| 5,450,747 A | 9/1995 | Flechsig et al. | |
| 5,736,808 A | 4/1998 | Szilagyi et al. | |
| 6,291,930 B1 | 9/2001 | Sager et al. | |
| 6,763,722 B2 | 7/2004 | Fjield et al. | |
| 7,009,326 B1 | 3/2006 | Matsuo et al. | |
| 7,336,022 B2 | 2/2008 | Schuh et al. | |
| 8,063,539 B2 | 11/2011 | Janker et al. | |
| 8,085,508 B2 | 12/2011 | Hatch et al. | |
| 8,347,221 B2 | 1/2013 | Griffin et al. | |
| 8,363,871 B2 | 1/2013 | Parker | |
| 8,619,044 B2 | 12/2013 | Pertuit et al. | |
| 8,837,760 B2 | 9/2014 | Andersson et al. | |
| 8,854,923 B1 * | 10/2014 | Eyster | H04R 17/00 310/317 |
| 8,965,021 B2 | 2/2015 | Adamson et al. | |
| 2005/0140249 A1 * | 6/2005 | Kita | B25J 7/00 310/359 |
| 2006/0049715 A1 * | 3/2006 | Onishi | H01L 41/042 310/317 |
| 2006/0185430 A1 * | 8/2006 | Yogeswaren | B06B 1/0622 73/152.16 |
| 2009/0079301 A1 | 3/2009 | Grohmann et al. | |
| 2010/0156814 A1 | 6/2010 | Weber et al. | |
| 2012/0119621 A1 * | 5/2012 | Frey | H01L 41/1134 310/330 |
| 2012/0146955 A1 | 6/2012 | Martin-Cocher et al. | |
| 2012/0229400 A1 | 9/2012 | Birnbaum et al. | |
| 2013/0342077 A1 | 12/2013 | Lautzenhiser et al. | |
| 2016/0273351 A1 * | 9/2016 | Fripp | E21B 47/18 |

OTHER PUBLICATIONS

Li et al., Finite element design of a new piezoelectricity bender disk transducer array, Dec. 10, 2010, 2 pages.
International Patent Application No. PCT/US2015/061538, International Search Report and Written Opinion, dated Aug. 19, 2016, 14 pages.
Pi—Piezo Technology, PD410 Round PICMA Multilayer Bender Actuators, retrieved from the internet at http://www.piceramic.com/product-detail-page/pd410-103050.html, at least as early as May 11, 2015, 2 pages.
Piezo Systems, Inc., Piezoelectric Bending Actuators, retrieved from the internet at http://www.piezo.com/prodbm64I.html, at least as early as May 11, 2015, 2 pages.
Shen et al., Pizoelectric Energy Harvesting Devices for Low Frequency Vibration Applications, 2009, pp. 28; 51 and 149-150.

* cited by examiner

DOWNHOLE PIEZOELECTRIC ACOUSTIC TRANSDUCER

CROSS-REFERENCE TO RELATED APPLICATIONS

This is a U.S. national phase under 35 U.S.C. 371 of International Patent Application No. PCT/US2015/061538, titled "Downhole Piezoelectric Acoustic Transducer" and filed Nov. 19, 2015, the entirety of which is incorporated herein by reference.

TECHNICAL FIELD

The present disclosure relates generally to devices for use in well systems. More specifically, but not by way of limitation, this disclosure relates to a piezoelectric acoustic transducer usable downhole.

BACKGROUND

A well system (e.g., oil or gas wells for extracting fluids from a subterranean formation) can include a wellbore drilled into a formation. It can be desirable to detect characteristics of the wellbore prior to, or subsequent to, positioning well tools in the wellbore. Sensors can be used to detect characteristics of the wellbore.

DETAILED DESCRIPTION

Figure 1:
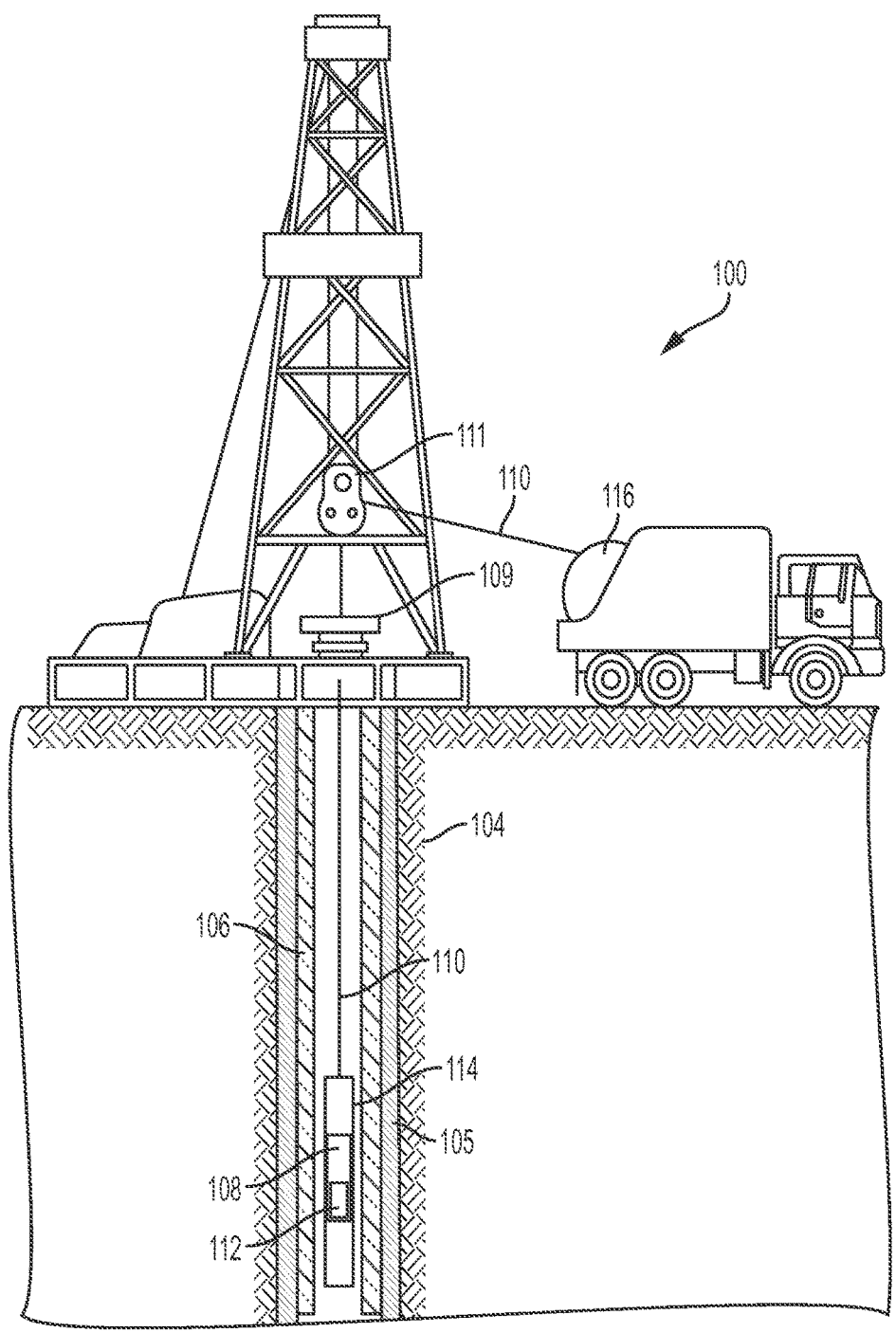
FIG. 1 is a cross-sectional view of an example of a well system that includes a downhole piezoelectric acoustic transducer according to some aspects.

Certain aspects and features of the present disclosure relate to a piezoelectric acoustic transducer that can generate acoustic waves in a fluid medium (e.g., a liquid or gas) in a wellbore. In some examples, the piezoelectric acoustic transducer can include a circular or disk cross-sectional shape. The piezoelectric acoustic transducer can include four piezoelectric layers stacked on top of one another and coupled to one another using a bonding material, such as an epoxy. Each of the piezoelectric layers can include a piezoelectric material, a top electrode coupled to a top surface of the piezoelectric material, and a bottom electrode coupled to a bottom surface of the piezoelectric material.

In some examples, the piezoelectric acoustic transducer can be electrically coupled to a power source. The power source can transmit an electrical signal to the top electrode and the bottom electrode of each piezoelectric layer to actuate the piezoelectric acoustic transducer. The electrical signal can include a frequency between 5 kHz and 30 kHz. Each piezoelectric layer can repeatedly bend back-and-forth between two positions in response to the electrical signal (e.g., as described with respect to FIGS. 4-8). This can mechanically generate pressure waves in the fluid medium. The pressure waves can be acoustic waves. The acoustic waves can propagate through a wellbore and reflect off objects in the wellbore.

In some examples, the piezoelectric acoustic transducer can be included in an acoustic sensing system configured to detect reflections and/or refractions of the acoustic waves. The acoustic sensing system can determine a characteristic of an object in the wellbore based on one or more properties of the reflections and/or refractions. For example, the acoustic sensing system can determine a distance from the sensing system to the object, a spatial position of the object, and/or a sound velocity of the object based on the properties of the reflections and/or refractions.

In some examples, the thickness of each piezoelectric layer of the piezoelectric acoustic transducer can be at least 500 micrometers. This thickness can provide the piezoelectric acoustic transducer with a desirable amount of rigidity to reduce the likelihood of the piezoelectric acoustic transducer fracturing or otherwise breaking in response to forces generated by the piezoelectric acoustic transducer.

In some examples, it can be desirable for the piezoelectric acoustic transducer to have exactly four piezoelectric layers. For example, reducing the number of piezoelectric layers to less than four can reduce an amplitude of an acoustic wave output by the piezoelectric acoustic transducer. Conversely, adding more piezoelectric layers to the piezoelectric acoustic transducer can increase an amount of bonding material in the piezoelectric acoustic transducer for coupling the layers together. This can dampen or distort the acoustic waves output by the piezoelectric acoustic transducer. In some examples, adding additional piezoelectric layers to the piezoelectric acoustic transducer can increase the thickness of the acoustic transducer to a size that may be impractical for particular applications. For example, a piezoelectric acoustic transducer that is more than four piezoelectric layers thick may not fit into a particular well tool or component of the well tool. In some examples, an acoustic transducer that is exactly four piezoelectric layers thick can provide an optimal combination of size, rigidity, and improved acoustic output.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 that includes a downhole piezoelectric acoustic transducer according to some aspects. The well system 100 includes a wellbore extending through various earth strata. The wellbore extends through a hydrocarbon bearing subterranean formation 104. A casing string 106 extends from the surface 109 to the subterranean formation 104. The casing string 106 can provide a conduit through which formation fluids, such as production fluids produced from the subterranean formation 104, can travel from the wellbore to the surface 109. The casing string 106 can be coupled to the walls of the wellbore via cement. For example, a cement sheath 105 can be positioned or formed between the casing string 106 and the walls of the wellbore for coupling the casing string 106 to the wellbore.

The well system 100 can also include at least one well tool 114 (e.g., a formation-testing tool). The well tool 114 can be coupled to a wireline 110, slickline, or coiled tubing that can be deployed into the wellbore. The wireline 110, slickline, or coiled tubing can be guided into the wellbore using, for example, a guide 111 or winch. In some examples, the wireline 110, slickline, or coiled tubing can be wound around a reel 116.

The well system 100 can include an acoustic sensing system 108. The acoustic sensing system 108 can include an acoustic transducer 112 for transmitting acoustic waves. In some examples, the acoustic transducer 112 can include at least four layers of piezoelectric material. The layers of piezoelectric material can be bonded together using an epoxy.

In some examples, the acoustic sensing system 108 can transmit an electrical signal to the acoustic transducer 112 to generate acoustic waves. In some examples, the acoustic waves can include a frequency between 5 kHz and 30 kHz. The electrical signal can cause the acoustic transducer 112 to repeatedly bend or flex (e.g., as discussed in greater detail with respect to FIGS. 4-8). The repeated bending of the acoustic transducer 112 can mechanically generate acoustic waves (e.g., pressure waves) in a medium in which the acoustic transducer 112 is positioned. The medium can include a gas or a liquid, such as oil or water. The acoustic waves can propagate through the medium and reflect and/or refract off one or more features of the wellbore. For example, the acoustic waves can reflect off the subterranean formation 104, rocks, the casing string 106, the cement sheath 105, or any combination of these.

In some examples, the acoustic sensing system 108 can detect the reflected and/or refracted acoustic waves (e.g., using an acoustic sensor, such as a microphone or a hydrophone) and analyze one or more characteristics of the reflected acoustic waves. The acoustic sensing system 108 can determine one or more characteristics of the wellbore based on the characteristics of the reflected acoustic waves. For example, the acoustic sensing system 108 can compare a time in which the acoustic sensing system 108 transmitted an acoustic wave to another time in which the acoustic sensing system 108 detected a reflection of the acoustic wave or a refraction of the acoustic wave to determine a difference between the times. In some examples, the acoustic sensing system 108 can determine a location, type, sound velocity, and/or material of an object in the wellbore based on the difference. For example, the acoustic sensing system 108 can determine that the object is a portion of a wall of the wellbore, that the object is located a particular distance from the acoustic sensing system 108 or the well tool 114, that the object includes a particular material, or any combination of these.

In some examples, the acoustic sensing system 108 can include multiple acoustic receivers for detecting reflected and/or refracted acoustic waves. For example, the acoustic sensing system 108 can include an array of acoustic transducers 112 configured for detecting reflected and/or refracted acoustic waves. In some examples, the acoustic sensing system 108 can use at least two of the acoustic receivers to detect reflected and/or refracted acoustic waves. The acoustic sensing system 108 can determine one or more characteristics of the object in the wellbore based on one or more characteristics of the reflected and/or refracted acoustic waves.

For example, the acoustic sensing system 108 can emit an acoustic wave. The acoustic wave can propagate through the wellbore and reflect and/or refract off an object in the wellbore. Two or more of the acoustic receivers can detect the reflection and/or refraction of the acoustic wave. In some examples, the two or more acoustic receivers can be positioned to detect the reflection and/or refraction of the acoustic wave at different times. The acoustic sensing system 108 can determine a characteristic of the object by analyzing the different times at which the acoustic receivers detected the reflection and/or refraction. For example, the acoustic sensing system 108 can determine a pattern associated with the different times. The pattern can be indicative of the object including a particular characteristic. The acoustic sensing system 108 can determine that the object includes the characteristic based on the presence of the pattern.

The acoustic sensing system 108 can additionally or alternatively determine other characteristics of an object in the wellbore, e.g., using any of the methods described above. For example, the acoustic sensing system 108 can determine a sound velocity that is characteristic of the object, a porosity of the object, a fracture characteristic of the object (e.g., whether the object includes a fracture), a material composition of the object, a texture of the object, or any combination of these. The acoustic sensing system 108 can determine any of these characteristics based on one or more parameters of one or more reflected and/or refracted acoustic waves detected by one or more acoustic receivers.

Figure 2:
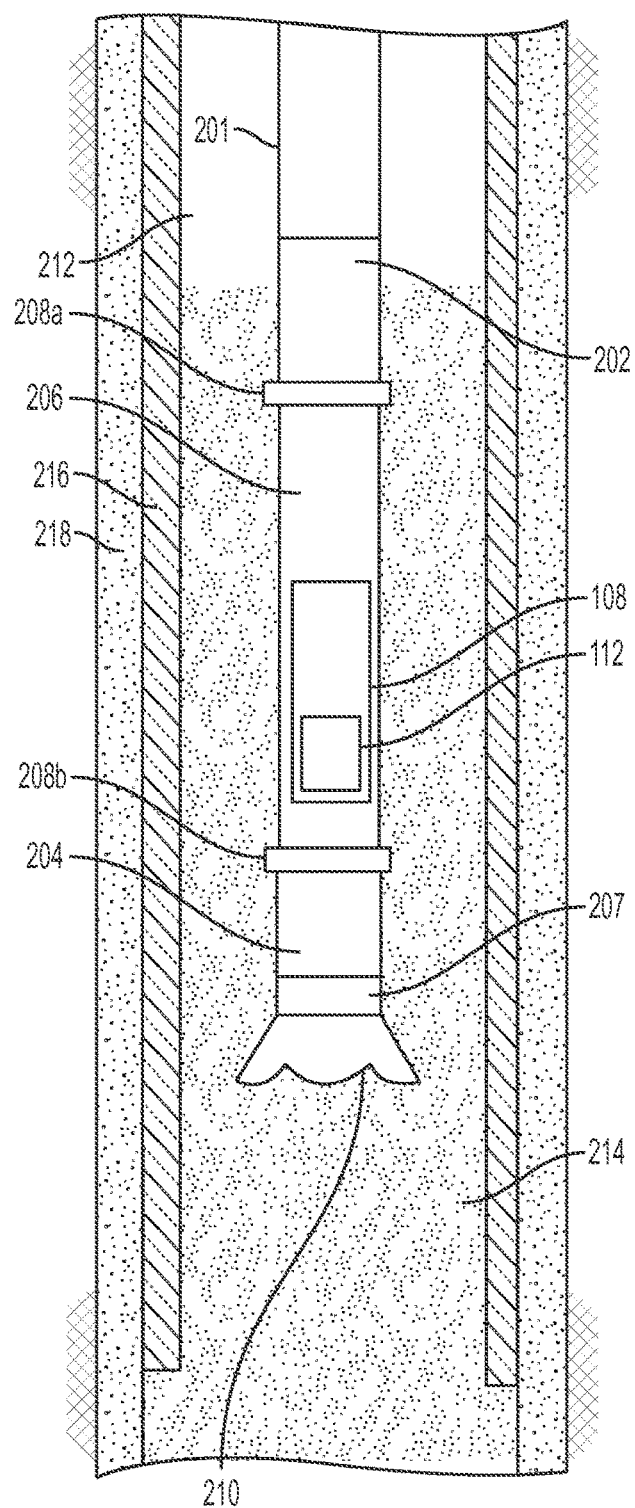
FIG. 2 is a cross-sectional view of an example of part of a well system that includes a downhole piezoelectric acoustic transducer according to some aspects.

FIG. 2 is a cross-sectional view of an example of part of a well system that includes a downhole piezoelectric acoustic transducer according to some aspects. The well system includes a wellbore. The wellbore can include a casing string 216 and a cement sheath 218. In some examples, the wellbore can include fluid 214. The fluid 214 (e.g., mud) can flow in an annulus 212 positioned between the well tool 201 and a wall of the casing string 216.

A well tool 201 (e.g., logging-while-drilling tool) can be positioned in the wellbore. The well tool 201 can include various subsystems 202, 204, 206, 207. For example, the well tool 201 can include a subsystem 202 that includes a communication subsystem. The well tool 201 can also include a subsystem 204 that includes a saver subsystem or a rotary steerable system. A tubular section or an intermediate subsystem 206 (e.g., a mud motor or measuring-while-drilling module) can be positioned between the other subsystems 202, 204. In some examples, the well tool 201 can include a drill bit 210 for drilling the wellbore. The drill bit 210 can be coupled to another tubular section or intermediate subsystem 207 (e.g., a measuring-while-drilling module or a rotary steerable system). In some examples, the well tool 201 can also include tubular joints 208a, 208b.

The well tool 201 can include an acoustic sensing system 108. The acoustic sensing system 108 can be positioned anywhere in the well tool 201 for sensing characteristics of the wellbore. The acoustic sensing system 108 can use an acoustic transducer 112 to transmit acoustic waves. The acoustic waves can propagate through a medium, such as fluid 214 (e.g., a liquid or gas) and reflect off one or more surfaces of the wellbore. The acoustic sensing system 108 can detect the reflected acoustic waves. The acoustic sensing system 108 can determine one or more characteristics of the wellbore based on the reflected acoustic waves.

Figure 3:
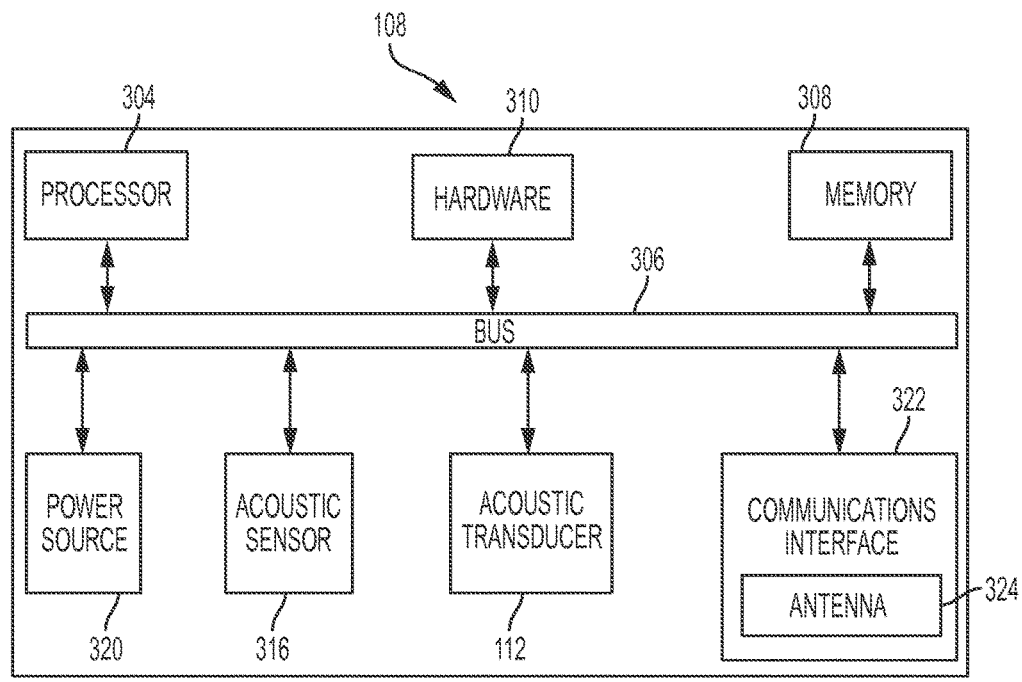
FIG. 3 is a block diagram of an example of an acoustic sensing system usable with a downhole piezoelectric acoustic transducer according to some aspects.

FIG. 3 is a block diagram of an example of an acoustic sensing system 108 usable with a downhole piezoelectric acoustic transducer according to some aspects. In some examples, the components shown in FIG. 3 (e.g., the power source 320, acoustic sensor 316, acoustic transducer 112, communications interface 322, processor 304, memory 308, and hardware 310) can be integrated into a single structure. For example, the components can be within a single housing. In other examples, the components shown in FIG. 3 can be distributed (e.g., in separate housings) and in electrical communication with each other.

The acoustic sensing system 108 can include a processor 304, a memory 308, and a bus 306. The processor 304 can execute one or more operations for operating the acoustic sensing system 108. The processor 304 can execute instructions stored in the memory 308 to perform the operations. The processor 304 can include one processing device or multiple processing devices. Non-limiting examples of the processor 304 include a Field-Programmable Gate Array ("FPGA"), an application-specific integrated circuit ("ASIC"), a microprocessor, etc.

The processor 304 can be communicatively coupled to the memory 308 via the bus 306. The non-volatile memory 308 may include any type of memory device that retains stored information when powered off. Non-limiting examples of the memory 308 include electrically erasable and programmable read-only memory ("EEPROM"), flash memory, or any other type of non-volatile memory. In some examples, at least some of the memory 308 can include a medium from which the processor 304 can read instructions. A computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which the processor 304 can read instructions. The instructions can include processor-specific instructions generated by a compiler or an interpreter from code written in any suitable computer-programming language, including, for example, C, C++, C#, etc.

The acoustic sensing system 108 can include a power source 320. In some examples, the power source 320 can include a battery or a thermal electric generator (e.g., for powering the acoustic sensing system 108). In other examples, the power source 320 can include an electrical cable (e.g., a wireline) electrically coupled to the acoustic sensing system 108.

The acoustic sensing system 108 can include a communications interface 322. The communications interface 322 can include a wired interface or a wireless interface (which can include an antenna 324). In some examples, part of the communications interface 322 can be implemented in software. For example, the communications interface 322 can include instructions stored in memory 308.

The acoustic sensing system 108 can use the communications interface to communicate with one or more external devices. In some examples, the communications interface 322 can amplify, filter, demodulate, demultiplex, demodulate, frequency shift, and otherwise manipulate a signal received from an external device. The communications interface 322 can transmit a signal associated with the received signal to the processor 304 or the hardware 310. The processor 304 or hardware 310 can receive and analyze the signal to retrieve data associated with the received signal.

In some examples, the acoustic sensing system 108 can analyze the data from the communications interface 322 and perform one or more functions. For example, the acoustic sensing system 108 can generate a response based on the data. The acoustic sensing system 108 (e.g., the processor 304) can cause a response signal associated with the response to be transmitted to the communications interface 322. The communications interface 322 can generate a transmission signal (e.g., via the antenna 324) to communicate the response to a remote electronic device. For example, the communications interface 322 can amplify, filter, modulate, frequency shift, multiplex, and otherwise manipulate the response signal to generate the transmission signal. In some examples, the communications interface 322 can encode data within the response signal using a modulation technique (e.g., frequency modulation, amplitude modulation, or phase modulation) to generate the transmission signal. The communications interface 322 can transmit the transmission signal to the antenna 324. The antenna 324 can receive the transmission signal and responsively generate a wireless communication. In this manner, the acoustic sensing system 108 can receive, analyze, and respond to communications from an external electronic device.

The acoustic sensing system 108 can include an acoustic sensor 316. The acoustic sensor 316 can detect acoustic waves. For example, the acoustic sensor 316 can detect reflections of acoustic waves and/or refractions of acoustic waves propagating through a wellbore. Examples of the acoustic sensor 316 can include a microphone or a hydrophone. A hydrophone can detect acoustic waves propagating through a liquid medium. The acoustic sensor 316 can transmit data to the processor 304, the hardware 310, or both. The processor 304 or hardware 310 can perform one or more functions based on the data, communicate the data (via the communications interface 322) to an external electronic device, or both. In some examples, the acoustic sensing system 108 can include multiple acoustic sensors 316. The acoustic sensors 316 can be arranged in an array. The acoustic sensors 316 and transmit data to the processor 304, the hardware 310, or both.

Figure 4:
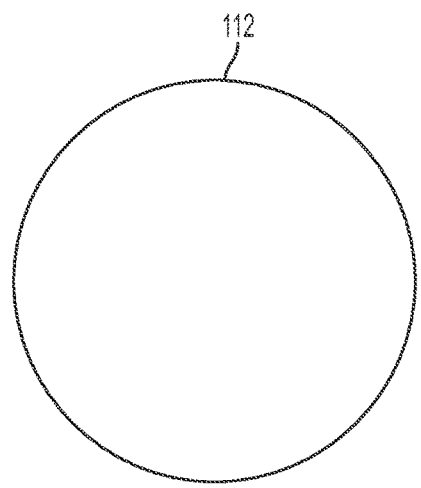
FIG. 4 is a top view of a downhole piezoelectric acoustic transducer according to some aspects.

The acoustic sensing system 108 can include an acoustic transducer 112. The acoustic transducer 112 can receive electrical signals and responsively generate acoustic waves. In some examples, the acoustic transducer 112 includes four layers of piezoelectric material. The layers of the acoustic transducer 112 can be affixed to one another using a bonding substance (e.g., epoxy or glue). In some examples, the acoustic transducer 112 can include a substantially circular or oval cross-sectional shape (e.g., as depicted in FIG. 4). For example, the cross-sectional end shape of the acoustic transducer 112 can include a circular shape. In some examples, the acoustic transducer 112 can be substantially configured, and can operate, as discussed with respect to FIGS. 5-9.

In some examples, the acoustic transducer 112 is, or includes, the acoustic sensor 316. In such an example, the acoustic transducer 112 may be able to generate acoustic waves and detect acoustic waves. For example, the acoustic sensing system 108 can use the acoustic transducer 112 to generate acoustic waves. The acoustic sensing system 108 can also use the acoustic transducer 112 to detect acoustic waves, e.g., propagating through a wellbore. In such examples, the acoustic sensing system 108 may not include a separate acoustic sensor 316.

The acoustic sensing system 108 can include other hardware 310. Examples of hardware 310 can include a processor, transistor, resistor, capacitor, inductor, integrated circuit component, a memory device, an operational amplifier, a tube, a comparator, a timing device, or any combination of these. In some examples, the hardware 310 can replace the functions of the processor 304, the memory 308, or both. For example, the hardware 310 can include any suitable combination of electrical components for operating acoustic sensor 316, acoustic transducer 112, communications interface 322, or any combination of these.

In some examples, the acoustic sensing system 108 can include more, fewer, or different components than those shown in FIG. 3. Additionally or alternatively, the components of the acoustic sensing system 108 can be configured differently than the configuration shown in FIG. 3. For example, the acoustic sensing system 108 may not include the processor 304, memory 308, or both. In such an example, the acoustic sensor 316 and communications interface 322 may be configured to directly communicate with one another or to communicate via bus 306. For example, the acoustic sensor 316 can be configured to directly communicate data to the communications interface 322 for wireless transmission. In some examples, the power source 320 can directly communicate with the acoustic transducer 112. For example, the power source 320 can directly transmit electrical signals to the acoustic transducer 112 to operate the acoustic transducer.

Figure 5:
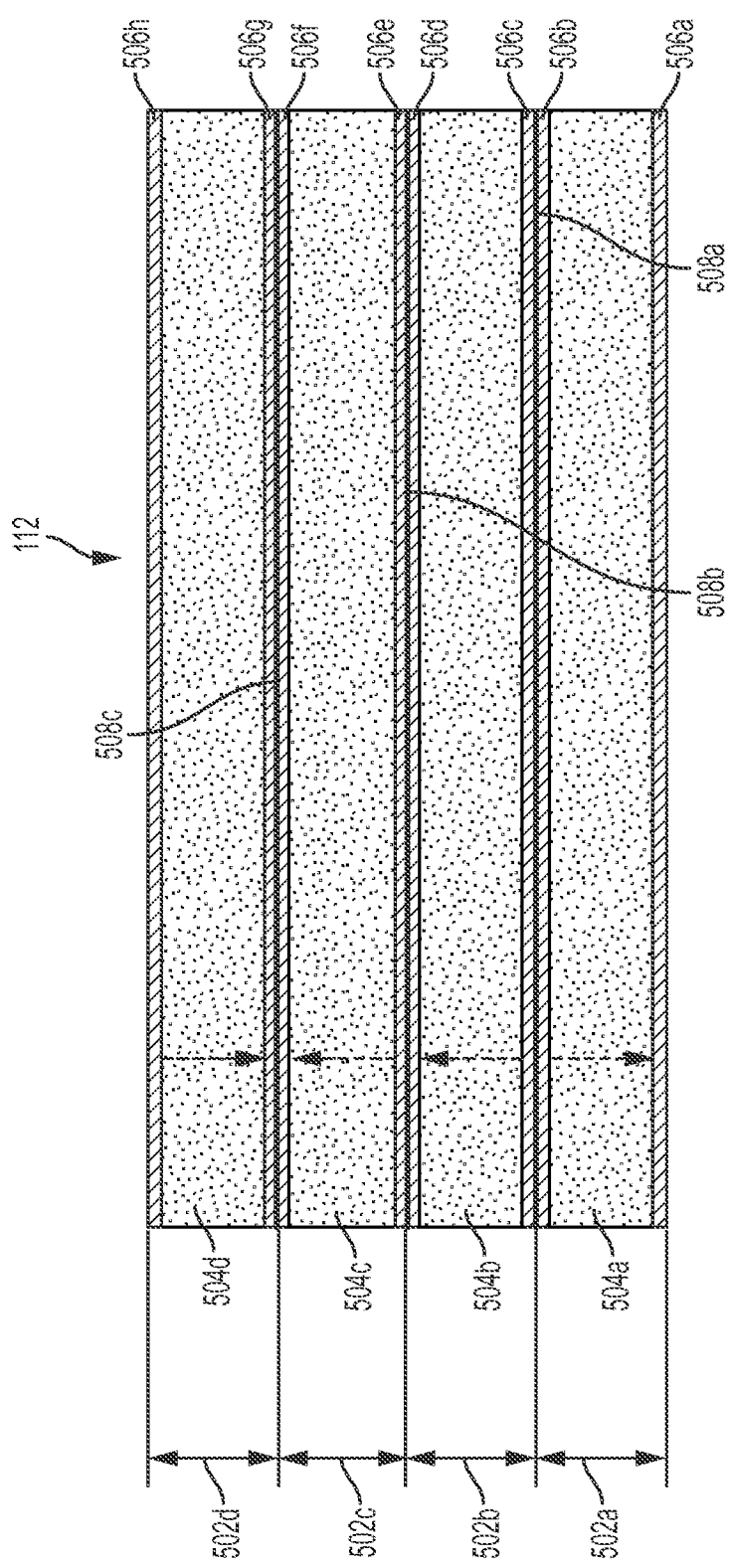
FIG. 5 is a cross-sectional side view of a downhole piezoelectric acoustic transducer according to some aspects.

FIG. 5 is a cross-sectional side view of a downhole piezoelectric acoustic transducer according to some aspects. The acoustic transducer 112 can include any number of layers 502*a*-*d*.

In some examples, the thickness of each layer 502*a*-*d* can be at least 500 micrometers. This thickness can provide the acoustic transducer 112 with a desirable amount of rigidity to reduce the likelihood of the acoustic transducer 112 fracturing or otherwise breaking in response to forces generated by the acoustic transducer 112. In some examples, the thickness of each layer 502*a*-*d* can be less than 2000 micrometers. This thickness can provide the acoustic transducer 112 with a desirable amount of flexibility to allow the acoustic transducer 112 to bend for generating acoustic waves.

Each layer 502*a*-*d* can include an associated piezoelectric material 504*a*-*d*. The piezoelectric materials 504*a*-*d* of the different layers 502*a*-*d* can be the same as one another or different from one another. The acoustic transducer 112 can include any combination of piezoelectric materials 504*a*-*d*. In some examples, the piezoelectric materials 504*a*-*d* can be polarized. For example, the piezoelectric materials 504*a*-*d* can be polarized in the directions shown by the dashed arrows. In other examples, the piezoelectric materials 504*a*-*d* can be polarized in the directions opposite to the directions shown by the dashed arrows.

Each layer 502*a*-*d* can include electrodes 506*a*-*h* coupled to a top surface and a bottom surface, respectively, of an associated piezoelectric material 504*a*-*d*. For example, layer 502*a* can include an electrode 506*b* coupled to a top surface of piezoelectric material 504*a* and another electrode 506*a* coupled to a bottom surface of the piezoelectric material 504*a*. In some examples, a top electrode 506*b* of one layer 502*a* can be bonded (e.g., via material 508*a*) to the bottom electrode 506*c* of an adjacent layer 502*b* to couple the adjacent layers 502*a*-*b* together. In other examples, two adjacent layers 502*a*-*b* can share a single electrode. For example, electrodes 506*b*-*c* can be combined into a single electrode that acts as a top electrode for one layer 502*a* and a bottom electrode for another layer 502*b*.

The acoustic transducer 112 can include one or more materials 508*a*-*c* positioned between one or more of the layers 502*a*-*d*. In some examples, the material 508*a*-*c* can include a bonding material for affixing adjacent layers to one another, rubber, foam, a non-piezoelectric material, or any combination of these. The bonding material can include an epoxy or glue. The materials 508*a*-*c* between each layer 502*a*-*d* can be the same as or different from one another. For example, one material 508*a* positioned between layers 502*a*-*b* can be the same as or different from another material 508*b* positioned between layers 502*b*-*c*. The material 508*b* positioned between layers 502*b*-*c* can be the same as or different from still another material 508*c* positioned between layers 502*c*-*d*.

In some examples, the materials 508*a*-*c* can include particular characteristics (e.g., a stiffness, flexibility, thickness, length, etc.) configured to tune a response of the acoustic transducer 112 to an electrical signal or an acoustic wave. For example, the materials 508*a*-*c* can be configured to alter the response of the acoustic transducer 112 to an electrical signal so that the acoustic transducer 112 performs in a particular manner. In some examples, the materials 508*a*-*c* can be selected to provide additional stiffness to the acoustic transducer 112 or to dampen a movement of the acoustic transducer 112. The additional stiffness or damping can reduce a bending displacement of the acoustic transducer 112 during operation, which can reduce or otherwise change a characteristic (e.g., an amplitude, frequency, waveform, etc.) of an acoustic wave generated by the acoustic transducer 112.

For example, the materials 508*a*-*c* can include a high stiffness epoxy. The high stiffness epoxy can increase a mechanical quality factor of the acoustic transducer 112. The increased mechanical quality factor can increase the amplitudes of acoustic waves output by the acoustic transducer 112. As another example, the materials 508*a*-*c* can include a low stiffness epoxy. The low stiffness epoxy can decrease the mechanical quality factor of the acoustic transducer 112. The decreased mechanical quality factor can reduce the amplitudes of acoustic waves output by the acoustic transducer 112. Additionally or alternatively, the decreased mechanical quality factor can increase a frequency bandwidth of the acoustic transducer 112.

In some examples, the acoustic transducer 112 includes exactly four layers 502*a*-*d*. Four layers 502*a*-*d* may allow the acoustic transducer 112 to have a desirable amount of both rigidity and flexibility for generating acoustic waves. In some examples, increasing the number of layers 502*a*-*d* beyond four may add rigidity to the acoustic transducer 112 that can hinder the operation of the acoustic transducer 112. For example, an additional layer can require another piezoelectric material layer, another two electrode layers, and another layer of a bonding substance to couple the additional layer to an adjacent layer. These additional materials can increase the overall rigidity of the acoustic transducer 112. The increased overall rigidity can reduce the ability of the acoustic transducer 112 to bend to generate acoustic waves.

Figure 6:
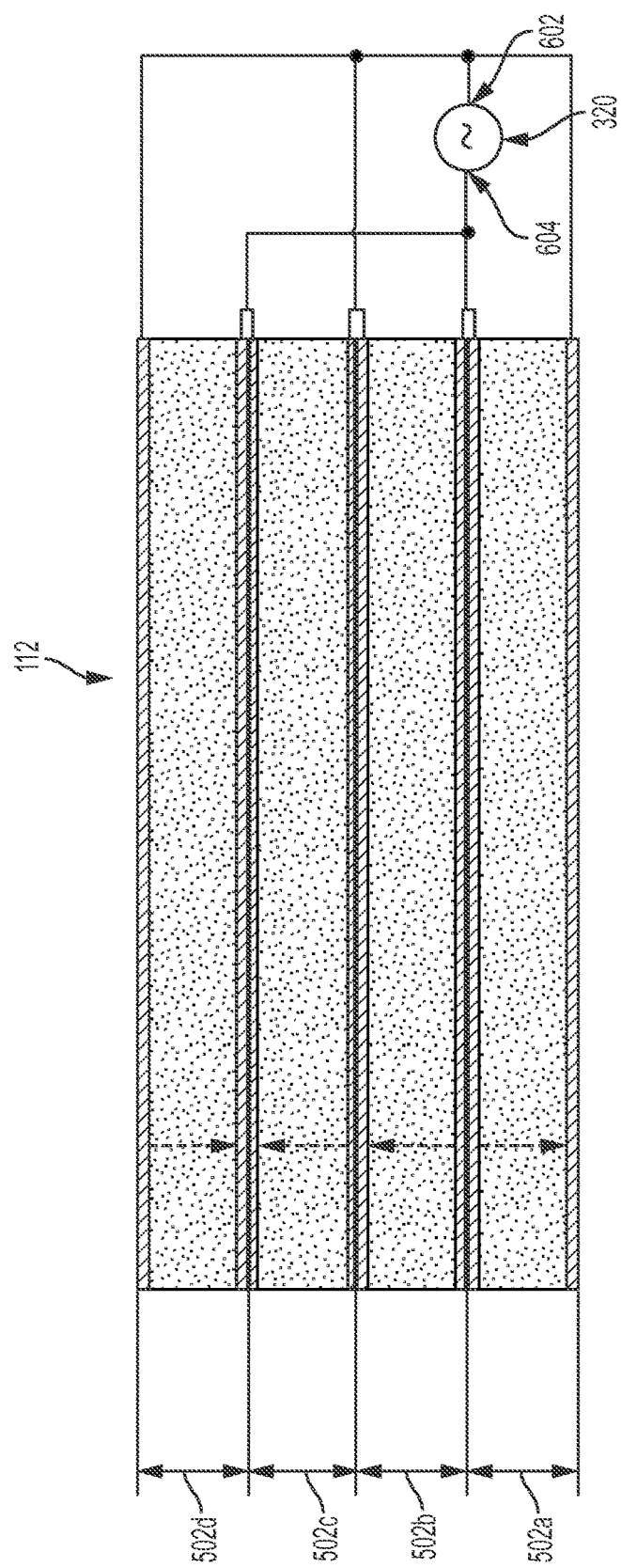
FIG. 6 is a cross-sectional side view of the downhole piezoelectric acoustic transducer of FIG. 5 coupled to a power source according to some aspects.

Referring now to FIG. 6, a power source 320 can be electrically coupled to the layers 502*a*-*d* (e.g., to the electrodes associated with each layer 502*a*-*d*) for operating the acoustic transducer 112. In some examples, one terminal 602 of the power source 320 and another terminal 604 of the power source 320 can be electrically coupled to alternating sets of electrodes. For example, a positive terminal of the power source 320 can be electrically coupled to a bottom electrode of layer 502a, a top electrode of layer 502b, a bottom electrode of layer 502c, and a top electrode of layer 502d. A negative terminal of the power source 320 can be electrically coupled to a top electrode of layer 502a, a bottom electrode of layer 502b, a top electrode of layer 502c, and a bottom electrode of layer 502d.

Figure 7:
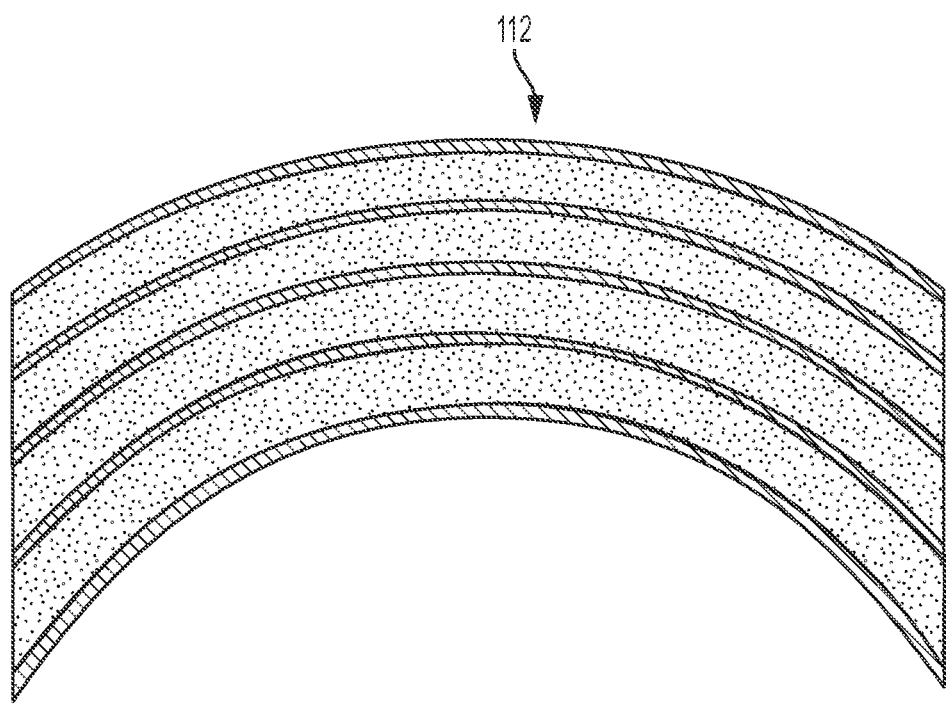
FIG. 7 is a cross-sectional side view of a downhole piezoelectric acoustic transducer bending in one direction according to some aspects.
Figure 8:
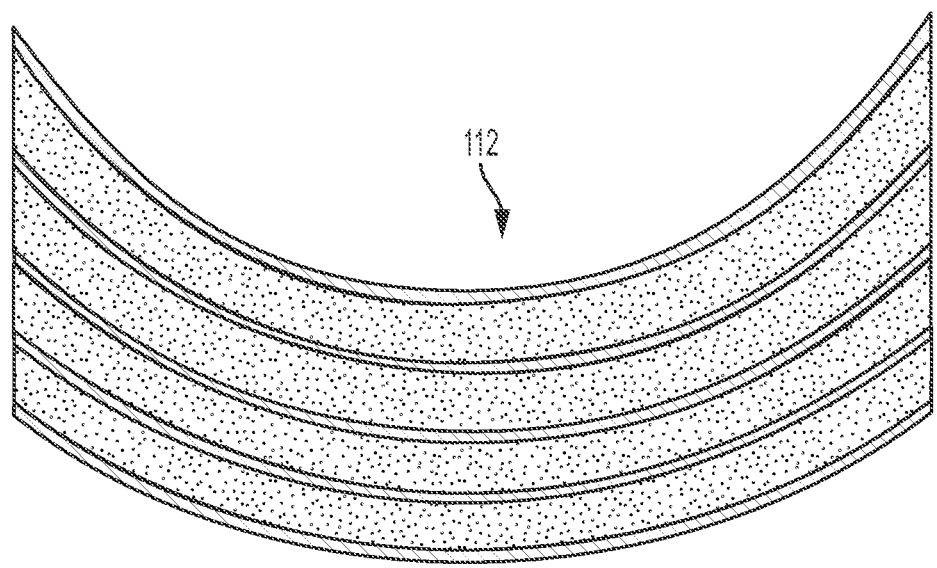
FIG. 8 is a cross-sectional side view of a downhole piezoelectric acoustic transducer bending in another direction according to some aspects.

The power source 320 can transmit an electrical signal (e.g., an AC electrical signal) to the electrodes to operate the acoustic transducer 112. The electrical signal can cause a top electrode and a bottom electrode of each respective layer 502a-d to generate an electric field within the layer 502a-d. The electrical field can stimulate the piezoelectric material of the layer 502a-d, causing the piezoelectric material to laterally expand or contract (e.g., expand or contract in the longitudinal direction). Because the layers 502a-d can be bonded to one another, the lateral expansion or contraction of the piezoelectric material can generate stress within the layer 502a-d. The stress can cause the piezoelectric material to bend into a concave shape or a convex shape (e.g., as shown in FIGS. 7 and 8, respectively). The shape of the bend can depend on the polarity of the electric field generated by the electrodes and the polarity of the piezoelectric material. In some examples, all of the layers 502a-d can bend in one direction when the electrical signal is positive (e.g., as shown in FIG. 7). For example, the longitudinal ends of the layers 502a-d can bend downward and the longitudinal middles of the layers 502a-d can be upward, generating a convex shape in the acoustic transducer 112. In some examples, all of the layers 502a-d can bend in the opposite direction when the electrical signal is negative (e.g., as shown in FIG. 8). For example, the longitudinal ends of the layers 502a-d can bend upward and the longitudinal middle of the layers 502a-d can be downward, generating a concave shape in the acoustic transducer 112.

In some examples, the power source 320 can transmit an AC electrical signal having a frequency to the acoustic transducer 112. The frequency can be between 5 kHz and 30 kHz. In some examples, the AC electrical signal can cause the layers 502a-d to repeatedly bend back and forth at a rate associated with the frequency of the AC signal. For example, the rate at which the layers 502a-d bend back and forth can be substantially the same as the frequency of the AC signal. The back-and-forth movement of the acoustic transducer 112 can mechanically generate acoustic waves (e.g., pressure waves) in a medium in which the acoustic transducer 112 is positioned. The medium can include a liquid, such as oil or water, or a gas. The acoustic waves can propagate through the medium and reflect off one or more features in a wellbore. The reflected acoustic waves can be detected by an acoustic sensor (e.g., acoustic sensor 316 of FIG. 3) and analyzed to determine one or more characteristics of the wellbore.

Figure 9:
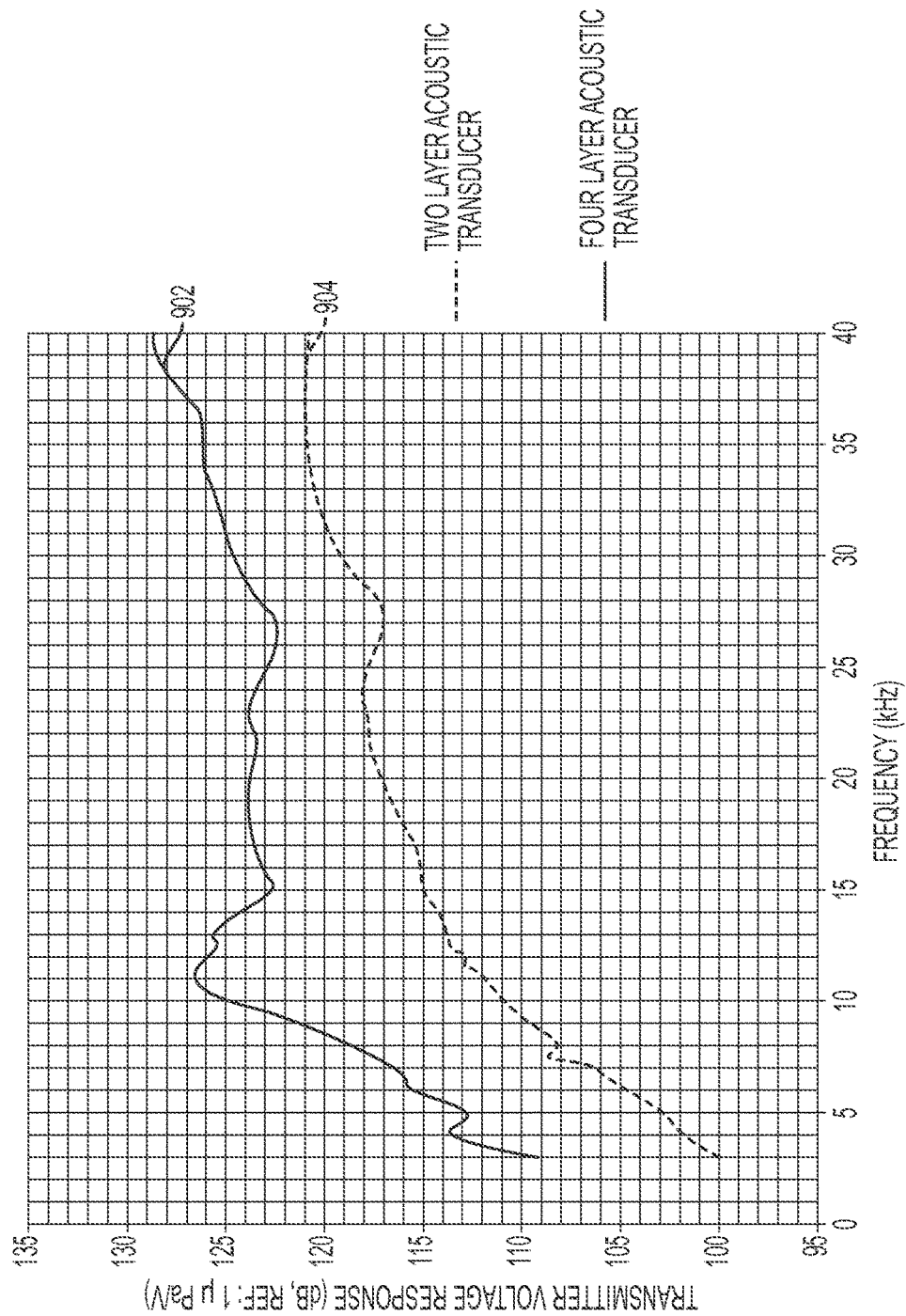
FIG. 9 is a graph depicting an example of amplitudes of acoustic waves output by a four layer acoustic transducer and a two layer acoustic transducer according to some aspects.

FIG. 9 is a graph depicting an example of amplitudes of acoustic waves output by a four layer acoustic transducer and a two layer acoustic transducer according to some aspects. Line 902 can represent the amplitudes of acoustic waves output by the four layer acoustic transducer and line 904 can represent the amplitudes of acoustic waves output by the two layer acoustic transducer.

In some examples, increasing the number of layers of the acoustic transducer can increase an amplitude of an acoustic wave output by the acoustic transducer. For example, the amplitudes of acoustic waves output by the four layer acoustic transducer can be more than 6 dB higher than the amplitudes of acoustic waves output by the two layer acoustic transducer. In one example, the four layer acoustic transducer can output an acoustic wave with an amplitude of 126.5 dB when actuated using an electrical signal with a frequency of 11 kHz. The two layer acoustic transducer can output an acoustic wave with an amplitude of 112 dB when actuated using the electrical signal with the frequency of 11 kHz. In such an example, the additional two layers in the four layer acoustic transducer lead to an amplitude increase of 14.5 dB.

In some examples, increasing the amplitudes of the acoustic waves output by the acoustic transducer can result in the reflections and/or refractions of the acoustic waves also having increased amplitudes. This can make it easier for an acoustic sensing system (e.g., acoustic sensing system 108 of FIG. 3) to detect the reflections and/or refractions, process the reflections and/or refractions, or any combination of these.

In some examples, it can be desirable for the acoustic transducer to have exactly four layers. Although adding more layers can theoretically further increase the amplitudes of acoustic waves output by the acoustic transducer, in some examples, adding more layers may result in numerous disadvantages. For example, adding more layers to the acoustic transducer can increase an amount of bonding material in the acoustic transducer for coupling the layers together. This can dampen or distort the acoustic waves output by the acoustic transducer. As another example, adding additional layers to the acoustic transducer can increase the thickness of the acoustic transducer to a size that may be impractical for particular applications. For example, an acoustic transducer that is more than four layers thick may not fit into a particular well tool or component of the well tool. In some examples, an acoustic transducer that is four layers thick can provide an optimal combination of size, rigidity, and improved acoustic output.

Figure 10:
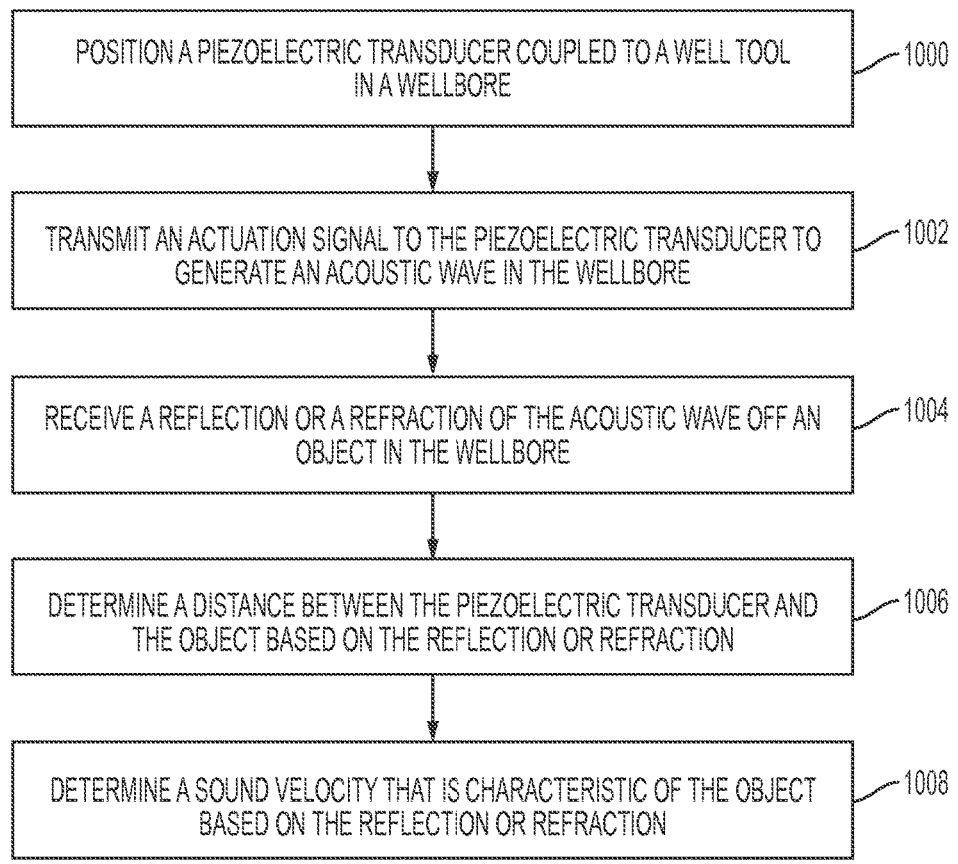
FIG. 10 is a flow chart of an example of a process for using a downhole piezoelectric acoustic transducer according to some aspects.

FIG. 10 is a flow chart of an example of a process for using a downhole piezoelectric acoustic transducer according to some aspects.

In block 1000, a piezoelectric transducer coupled to a well tool is positioned in a wellbore. The piezoelectric transducer can include at least four piezoelectric layers stacked on top of one another. In some examples, the well tool can include the piezoelectric transducer. The well tool can be positioned in the wellbore via wireline, for example, as shown in FIG. 1.

In block 1002, an acoustic sensing system transmits an actuation signal to the piezoelectric transducer to generate an acoustic wave in the wellbore. For example, a processor of the acoustic sensing system can transmit the actuation signal to the piezoelectric transducer. In some examples, the actuation signal can include a frequency between 5 kHz and 30 kHz. The actuation signal may cause the piezoelectric transducer to bend between at least two positions, thereby generating the acoustic wave in the wellbore. In some examples, the acoustic wave can include a frequency that is substantially similar to the frequency of the actuation signal.

In block 1004, the acoustic sensing system receives a reflection or a refraction of the acoustic wave off an object in the wellbore. For example, as the acoustic wave propagates through the wellbore, the acoustic wave can reflect or refract off objects in the wellbore. The reflections or refractions can be detected by an acoustic sensor (e.g., a hydrophone) of the acoustic sensing system.

In block 1006, the acoustic sensing system determines a distance between the piezoelectric transducer and the object based on the reflection or the refraction. For example, the acoustic sensing system can store a timestamp associated with when the acoustic sensing system transmitted the acoustic wave. The acoustic sensing system can store another timestamp associated with when the acoustic sensing system received the reflection or refraction. The acoustic sensing system can determine a difference between the timestamps. The acoustic sensing system can use the difference to determine the distance between the piezoelectric transducer and the object.

In block 1008, the acoustic sensing system determines a sound velocity that is characteristic of the object based on the reflection or the refraction. For example, the acoustic sensing system can store a timestamp associated with when the acoustic sensing system transmitted the acoustic wave. The acoustic sensing system can store another timestamp associated with when the acoustic sensing system received the reflection or refraction. The acoustic sensing system can determine a difference between the timestamps. The acoustic sensing system can use the difference to determine the sound velocity that is characteristic of the object.

In some aspects, a downhole piezoelectric acoustic transducer is provided according to one or more of the following examples:

Example #1

A sensor system for use in a wellbore can include a piezoelectric transducer for generating an acoustic wave in a fluid medium of the wellbore by repeatedly bending between two positions in response to an actuation signal. The piezoelectric transducer can include at least four piezoelectric layers stacked on top of one another. Each layer of the at least four piezoelectric layers can be coupled to an adjacent layer via a bonding material. Each layer of the four piezoelectric layers can include a piezoelectric material, a top electrode coupled to a top surface of the piezoelectric material, and a bottom electrode coupled to a bottom surface of the piezoelectric material. The sensor system can also include a hydrophone for detecting a reflection or a refraction of the acoustic wave off the object in the wellbore transmitting an associated signal to a processing device.

Example #2

The sensor system of Example #1 may feature the piezoelectric transducer including a circular cross-sectional shape and exactly four piezoelectric layers. The sensor system may feature the bonding material including an epoxy.

Example #3

The sensor system of any of Examples #1-2 may feature each of the four piezoelectric layers being at least 500 micrometers thick. The sensor system may feature the actuation signal including a frequency of between 5 kHz and 30 kHz for generating the acoustic wave with a corresponding frequency.

Example #4

The sensor system of any of Examples #1-3 may feature a middle two of the four piezoelectric layers being polarized in one direction and an outer two of the four piezoelectric layers being polarized in an opposite direction.

Example #5

The sensor system of any of Examples #1-4 may feature the processing device in communication with the piezoelectric transducer and the hydrophone, and a memory device in which instructions executable by the processing device are stored. The instructions can be for causing the processing device to receive the signal from the hydrophone, and determine a distance between the sensor system and the object or a sound velocity that is characteristic of the object based on the signal.

Example #6

The sensor system of any of Examples #1-5 may feature a material being positioned between at least two of the four piezoelectric layers for tuning a response characteristic of the piezoelectric transducer.

Example #7

The sensor system of any of Examples #1-6 may feature sensor system being positioned in a well tool comprising a logging-while-drilling tool or a wireline tool.

Example #8

A well tool usable in a wellbore can include a piezoelectric transducer for generating an acoustic wave in a fluid medium positioned in the wellbore. The piezoelectric transducer can include at least four piezoelectric layers stacked on top of one another. Each layer of the at least four piezoelectric layers can be coupled to an adjacent layer via a bonding material and include a piezoelectric material, a top electrode coupled to a top surface of the piezoelectric material, and a bottom electrode coupled to a bottom surface of the piezoelectric material.

Example #9

The well tool of Example #8 may feature the piezoelectric transducer including a circular shape and the bonding material including an epoxy.

Example #10

The well tool of any of Examples #8-9 may feature the piezoelectric transducer generating the acoustic wave by repeatedly bending between two positions in response to an actuation signal.

Example #11

The well tool of Example #10 may feature the actuation signal including a frequency of between 5 kHz and 30 kHz for generating the acoustic wave with a corresponding frequency.

Example #12

The well tool of any of Examples #8-11 may feature each of the at least four piezoelectric layers being at least 500 micrometers thick.

Example #13

The well tool of any of Examples #8-12 may feature the piezoelectric transducer including exactly four piezoelectric layers. A middle two of the four piezoelectric layers can be polarized in one direction and an outer two of the four piezoelectric layers can be polarized in an opposite direction.

Example #14

The well tool of any of Examples #8-13 may feature an acoustic sensor for detecting a reflection or a refraction of the acoustic wave off an object in the wellbore and transmitting an associated signal. The well tool may also feature a processing device in communication with the piezoelectric transducer and the acoustic sensor. The well tool may further feature a memory device in which instructions executable by the processing device are stored for causing the processing device to receive the signal from the acoustic sensor, and determine a distance between the well tool and the object or a sound velocity that is characteristic of the object based on the signal.

Example #15

The well tool of any of Examples #8-14 may feature a material being positioned between at least two of the at least four piezoelectric layers for tuning a response characteristic of the piezoelectric transducer.

Example #16

The well tool of any of Examples #8-15 may feature the well tool including a logging-while-drilling tool or a wireline tool.

Example #17

A method can include positioning a piezoelectric transducer coupled to a well tool in a wellbore. The piezoelectric transducer can include at least four piezoelectric layers stacked on top of one another. The method can include transmitting an actuation signal to the piezoelectric transducer for actuating the piezoelectric transducer. The actuation signal can cause the piezoelectric transducer to generate an acoustic wave in a fluid medium of the wellbore by repeatedly bending between two positions.

Example #18

The method of Example #17 may feature receiving, via a hydrophone, a reflection or a refraction of the acoustic wave off an object in the wellbore.

Example #19

The method of Example #18 may feature determining a distance between the piezoelectric transducer and the object based on the reflection or refraction of the acoustic wave.

Example #20

The method of any of Examples #18-19 may feature determining a sound velocity that is characteristic of the object based on the reflection or refraction of the acoustic wave.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A sensor system for use in a wellbore, the sensor system comprising:
    a piezoelectric transducer for generating an acoustic wave in a fluid medium of the wellbore by repeatedly bending between two positions in response to an actuation signal, the piezoelectric transducer comprising exactly four piezoelectric layers stacked on top of one another, each layer of the four piezoelectric layers coupled to an adjacent layer via a bonding material and comprising:
        a piezoelectric material,
        a top electrode coupled to a top surface of the piezoelectric material, and
        a bottom electrode coupled to a bottom surface of the piezoelectric material;
    wherein a middle two of the four piezoelectric layers are polarized in one direction and an outer two of the four piezoelectric layers are polarized in an opposite direction; and
    a hydrophone for detecting a reflection or a refraction of the acoustic wave off an object in the wellbore and transmitting an associated signal to a processing device.

2. The sensor system of claim 1, wherein the piezoelectric transducer comprises a circular cross-sectional shape, and wherein the bonding material comprises an epoxy.

3. The sensor system of claim 2, wherein each of the four piezoelectric layers is at least 500 micrometers thick, and wherein the actuation signal comprises a frequency of between 5 kHz and 30 kHz for generating the acoustic wave with a corresponding frequency.

4. The sensor system of claim 1, further comprising:
    the processing device in communication with the piezoelectric transducer and the hydrophone; and
    a memory device in which instructions executable by the processing device are stored for causing the processing device to:
        receive the signal from the hydrophone; and
        determine a distance between the sensor system and the object or a sound velocity that is characteristic of the object based on the signal.

5. The sensor system of claim 4, wherein a material is positioned between at least two of the four piezoelectric layers for tuning a response characteristic of the piezoelectric transducer.

6. The sensor system of claim 5, wherein the sensor system is positioned in a well tool comprising a logging-while-drilling tool or a wireline tool.

7. A well tool usable in a wellbore, the well tool comprising:
    a piezoelectric transducer for generating an acoustic wave in a fluid medium positioned in the wellbore, the piezoelectric transducer comprising exactly four piezoelectric layers stacked on top of one another, each layer of the four piezoelectric layers coupled to an adjacent layer via a bonding material and comprising:
        a piezoelectric material,
        a top electrode coupled to a top surface of the piezoelectric material, and
        a bottom electrode coupled to a bottom surface of the piezoelectric material;
    wherein a middle two of the four piezoelectric layers are polarized in one direction and an outer two of the four piezoelectric layers are polarized in an opposite direction.

8. The well tool of claim 7, wherein the piezoelectric transducer comprises a circular shape and the bonding material comprises an epoxy.

9. The well tool of claim 7, wherein the piezoelectric transducer generates the acoustic wave by repeatedly bending between two positions in response to an actuation signal.

10. The well tool of claim 9, wherein the actuation signal comprises a frequency of between 5 kHz and 30 kHz for generating the acoustic wave with a corresponding frequency.

11. The well tool of claim 7, wherein each of the four piezoelectric layers is at least 500 micrometers thick.

12. The well tool of claim 7, further comprising:
an acoustic sensor for detecting a reflection or a refraction of the acoustic wave off an object in the wellbore and transmitting an associated signal;
a processing device in communication with the piezoelectric transducer and the acoustic sensor; and
a memory device in which instructions executable by the processing device are stored for causing the processing device to:
receive the signal from the acoustic sensor; and
determine a distance between the well tool and the object or a sound velocity that is characteristic of the object based on the signal.

13. The well tool of claim 7, wherein a material is positioned between at least two of the four piezoelectric layers for tuning a response characteristic of the piezoelectric transducer.

14. The well tool of claim 7, wherein the well tool comprises a logging-while-drilling tool or a wireline tool.

15. A method comprising:
positioning a piezoelectric transducer coupled to a well tool in a wellbore, the piezoelectric transducer including exactly four piezoelectric layers stacked on top of one another, wherein a middle two of the four piezoelectric layers are polarized in one direction and an outer two of the four piezoelectric layers are polarized in an opposite direction; and
transmitting an actuation signal to the piezoelectric transducer for actuating the piezoelectric transducer, the actuation signal causing the piezoelectric transducer to generate an acoustic wave in a fluid medium of the wellbore by repeatedly bending between two positions.

16. The method of claim 15, further comprising:
receiving, via a hydrophone, a reflection or a refraction of the acoustic wave off an object in the wellbore.

17. The method of claim 16, further comprising:
determining a distance between the piezoelectric transducer and the object based on the reflection or refraction of the acoustic wave.

18. The method of claim 16, further comprising:
determining a sound velocity that is characteristic of the object based on the reflection or refraction of the acoustic wave.

* * * * *